United States Patent [19]

Scott et al.

[11] Patent Number: 5,211,597
[45] Date of Patent: May 18, 1993

[54] PORTABLE BEEHIVE

[75] Inventors: Charles W. Scott, Traverse City; Michael D. Kish, Kentwood, both of Mich.

[73] Assignee: Nucleus Specialties, Inc., Traverse City, Mich.

[21] Appl. No.: 864,325

[22] Filed: Apr. 6, 1992

[51] Int. Cl.$^5$ .............................................. A01K 47/00
[52] U.S. Cl. ...................................... 449/27; 449/30; 449/37
[58] Field of Search ................... 449/3, 9, 15, 16, 27, 449/28, 29, 35, 37, 30

[56] References Cited

U.S. PATENT DOCUMENTS

| | | | |
|---|---|---|---|
| 348,308 | 8/1886 | Beeler, Jr. | 449/29 X |
| 1,414,284 | 4/1922 | Jones | 449/9 |
| 1,502,278 | 7/1924 | Stevens | 449/27 |
| 1,871,595 | 8/1932 | Eldred | 449/30 |
| 2,276,768 | 3/1942 | Flanagan | 449/27 |
| 3,200,419 | 8/1965 | Root | 449/25 X |

OTHER PUBLICATIONS

Sketch of portable beehive.

Primary Examiner—Robert P. Swiatek
Attorney, Agent, or Firm—Warner, Norcross & Judd

[57] ABSTRACT

A portable beehive is disclosed for use in transporting a population of bees between a beekeeper facility and an orchard or the like. The portable beehive includes a box formed from a folded, single-piece blank, and a removable top cover. The interior of the box has inner end walls which form ledges for suspending honeycomb frames within the box. An exit opening is formed through an end wall of the box, and the exit is closed or opened by a door flap. The door flap, when opened, functions as a mat upon which may be placed concentrated pollen for transfer to the bees. Pivotable carrying handles perform multiple functions including holding the top cover in place, limiting the movement of the honeycomb frames within the box, and holding a bee food container in place atop the cover. A space is formed between the rear inner end wall and the rear outer end wall in which bee food may be placed; openings are provided in the rear inner end wall through which bees may access the food.

29 Claims, 6 Drawing Sheets

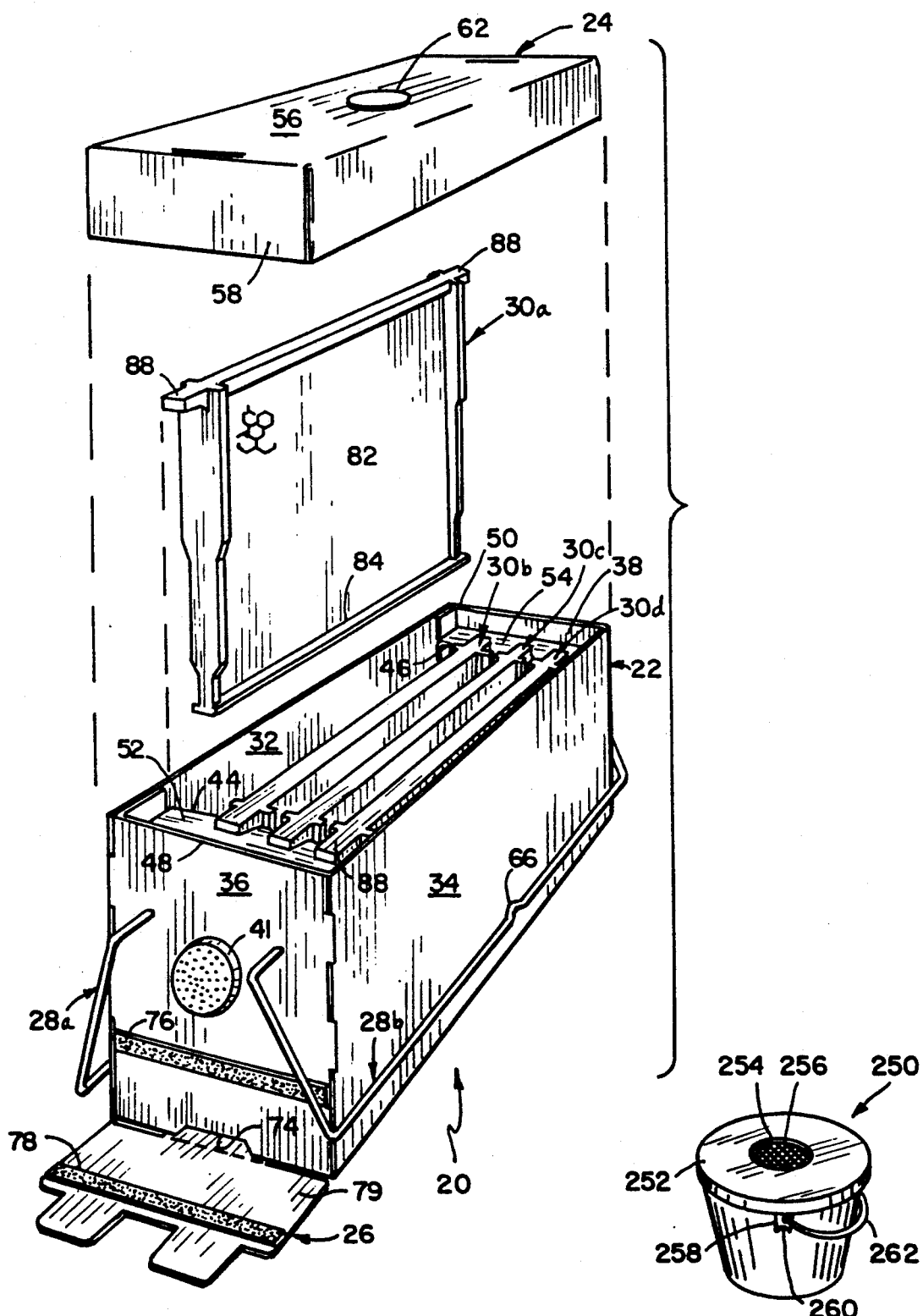

PORTABLE BEEHIVE

BACKGROUND OF THE INVENTION

1. field of the Invention

The present invention relates to beekeeping and, more particularly, to a portable beehive.

2. Description of the Related Art

The presence of bees is essential for the pollination of many commercially grown plants. Without pollination, orchard trees, for example, will not bear fruit. Therefore, it is a matter of great importance to a commercial grower to have an ample population of bees at hand at pollination season.

Once pollination has occurred and fruit is growing, the presence of destructive insects may dictate the application of insecticide to the orchard. However, the insecticide may be harmful to the population of beneficial bees. Thus, there is a need for a means to bring bees to an orchard for pollination, and to remove the bees from the orchard when insecticide is used.

To meet this need, beekeepers have rented beehives for temporary use by growers. In the past, traditional wooden hives populated by bees have been placed on pallets. The pallets, along with the hives, are lifted onto trucks and delivered to orchards or other sites where pollination is needed. When pollination is completed, the hives and pallets are returned to the beekeeper, or transferred to another site where pollination is needed.

Since traditional hives are not designed for portable use, there are several disadvantages to using them in this manner. The hives and pallets are expensive, large, and heavy. A flat-bed truck and fork lift may be required to lift and transport the hives and pallets. Such hives do not have a convenient means for shutting up the bees within the hive, so an experienced beekeeper with protective clothing may be needed to load, deliver, and retrieve the hive. The large hives result in a concentration of the bee population in a small area of the orchard rather than a wide, even distribution of bees throughout the orchard.

Accordingly, there is a heretofore unmet need for a beehive that is readily portable, easily sealed and opened, economically constructed, and safe for use by persons unskilled in beekeeping.

SUMMARY OF THE INVENTION

The present invention satisfies the aforementioned need by providing a portable beehive in the form of a lightweight, easily carried box.

In the preferred embodiment of the invention, the portable beehive includes a box and cover made of corrugated plastic material. The box is provided with carrying handles. The box is further provided with an exit opening through which bees may pass in and out of the box. A hinged door flap is provided to close and open the exit opening. When the door flap is opened, it forms a mat upon which concentrated pollen may be placed. As bees leave the box through the exit opening, the concentrated pollen is transferred to the bees.

The box and cover are configured to be economically and efficiently constructed from one-piece, folded blanks. No adhesives or fasteners are required to maintain the box and cover in their properly folded forms.

The interior of the box is provided with inner end walls which form ledges at opposite ends of the box. Honeycomb frames are placed within the box suspended from the ledges. There is a chamber between the rear inner end wall and the rear inner end wall which may be used to contain a granular bee food. Openings in the inner end wall allow bees to access the food from the interior of the box.

The carrying handles of the portable beehive perform multiple functions. The ends of the handles are pivot pins which extend through the end walls of the box and between the honeycomb frames; the frames are thus held in position by the pivot pin ends of the handles. The handles may be criss-crossed over the top of the cover to hold the cover in place. Also, the cover has an opening to admit bee food from a container placed atop the cover; the handles have detents which may be engaged with the bee food container to hold the container in place.

Thus, the portable beehive of the invention may be conveniently rented to an orchard grower and easily transported between the beekeeper's facility and the orchard. The orchard grower may conveniently rent beehives in sufficient numbers for them to be dispersed throughout the orchard. When the beehives are not being used to house bees, they may be unfolded and stored flat in a minimum of space.

These and other objects, advantages, and features of the present invention will be more fully understood and appreciated by reference to the written specification and appended drawings.

BRIEF DESCRIPTION OF THE DRAWINGS

FIG. 2 is an exploded perspective view of the portable beehive;

FIG. 17 is a perspective view of a bee food container for use with the portable beehive;

DESCRIPTION OF THE PREFERRED EMBODIMENT

Figure 1:
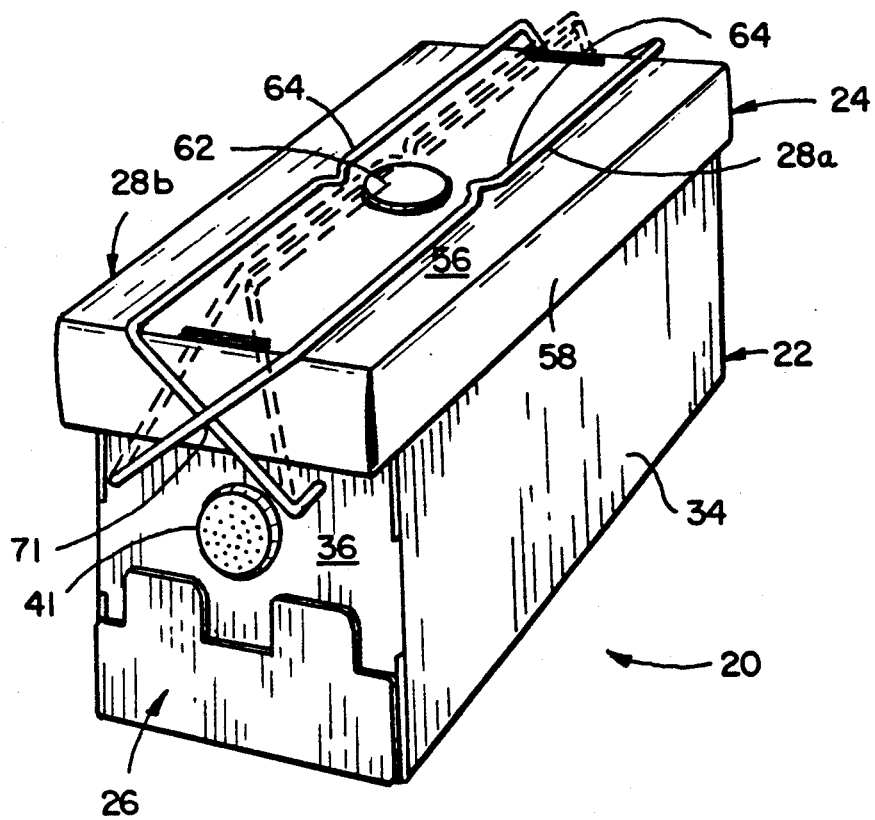
FIG. 1 is a perspective view of a portable beehive according to the invention.

By way of disclosing a preferred embodiment of the invention, and not by way of limitation, there is shown in FIGS. 1-4 a portable beehive 20 which includes in its general organization an open top box 22, a removable cover 24, a door flap 26, two handles 28a, 28b, and four honeycomb frames 30a-30d (FIG. 2).

Box 20 is generally rectangular, and includes vertical, longitudinally extending, spaced apart side left and right side panels or walls 32, 34; vertical, transversely extending, spaced apart front and rear outer end panels or walls 36, 38; and a horizontal bottom panel 39. The side walls, end walls, and bottom are joined along their adjacent edges at mutually perpendicular angles. Each outer end wall 36, 38 is formed with a circular opening covered by a perforated plug 41.

The box 22 further includes vertical front and rear inner end panels or walls 40, 42 (FIG. 3) which are spaced longitudinally inwardly from the adjacent outer end walls 36, 38, respectively. The upper edge 44, 46 of each inner end wall 40, 42 is spaced downwardly from the upper edge 48, 50 of the adjacent outer end wall. A front ledge 52 extends horizontally between the upper edge 44 of front inner end wall 40 and front outer end wall 36. Similarly, rear ledge 54 extends horizontally between rear inner end wall 42 and rear outer end wall 38. A rectangular cavity is thus defined by the side walls 32, 34 and inner end walls 40, 42. The honeycomb frames 30a-30d are received, and bees are housed, within the rectangular cavity.

Cover 24 is formed with a horizontally extending top panel 56 having length and width dimensions slightly larger than those of the open, upper perimeter of the box 20. Cover 24 further includes a peripheral, depending skirt 58 which encircles the upper extent of the box when the portable beehive is closed. The top panel 56 is formed with a central, circular feeding opening 60 through which bee food may be introduced into the box in a manner more fully described below. The feeding opening 60 is closed by a removable plug 62.

Figure 4:
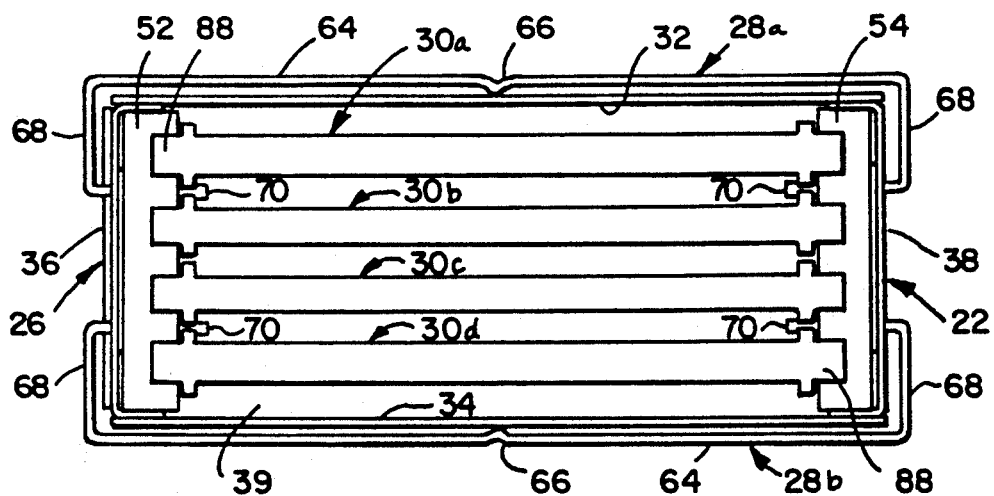
FIG. 4 is a top view of the portable beehive with the cover removed.

Each handle 28a, 28b is a bail-like bent rod, preferably of metal, longitudinally spanning the box 22 and cover 24. As best shown in FIG. 4, each handle has a longitudinally extending grasping portion 64 of a length slightly greater than the length of the cover 24. The center of each grasping portion is formed with a V-shaped detent 66 used to secure a bee food container as more fully described below. Extending perpendicularly at each of the opposite ends of the grasping portion 64 there are arm portions 68. Arm portions extend in a vertical plane toward the central portion of the outer end walls 36.

Figure 3:
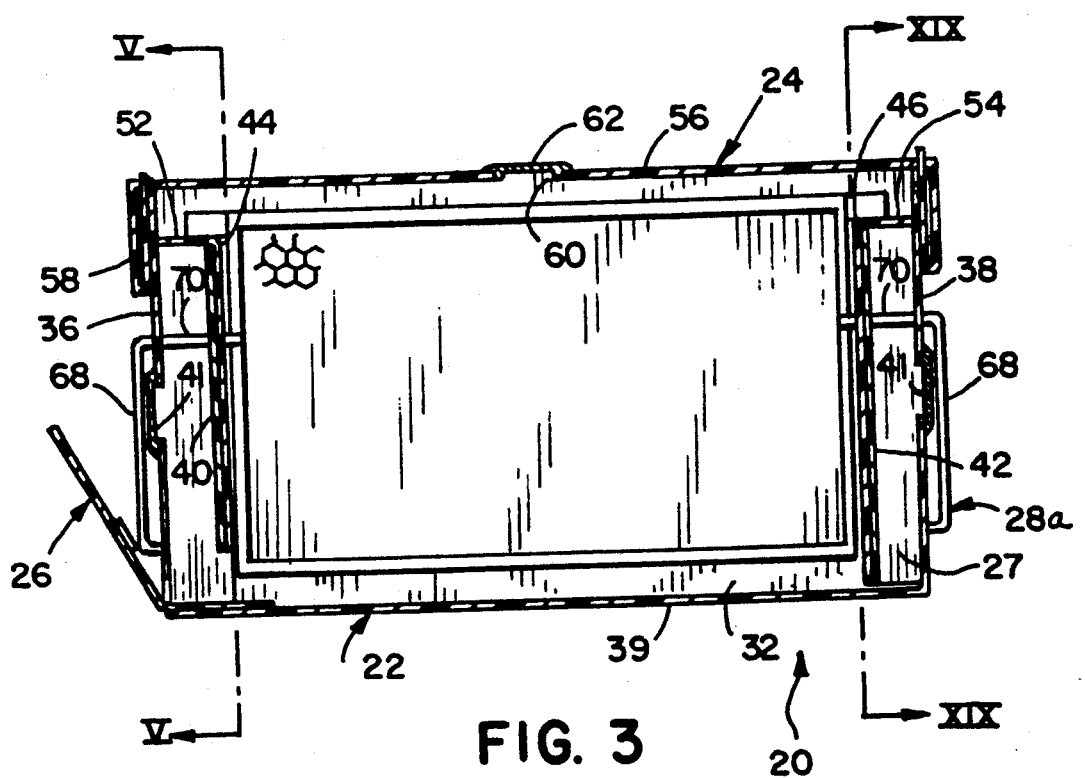
FIG. 3 is a side sectional view of the portable beehive taken between the first and second honeycomb frames.

Pivot pin portions 70 extend longitudinally inwardly from the ends of the arm portions 68 opposite the grasping portions. As best shown in FIG. 3, each pivot pin portion 70 extends through coaligned holes formed in an outer end wall and an adjacent inner end wall. The free ends of the pivot pin portions 70 extend beyond the inner surface of the inner end walls 40, 42 into the interior of the box. As shown in FIGS. 3 and 4, the pivot pin ends are interposed between the adjacent pair of honeycomb frames 30a and 30b, and between the adjacent pair of honeycomb frames 30c and 30d. With this arrangement, the pivot pin ends of the handles serve as spacers which limit the range of transverse movement of the honeycomb panels within the box.

As shown in FIG. 1, the handles 28a, 28b are arranged so that they may be criss-crossed. In this position, the grasping portions 64 of the handles lie atop the cover 24, thus securing the cover against inadvertent loosening or removal. When so criss-crossed, one handle will be resiliently flexed and straddle the other. In FIG. 1, handle 28a is straddling handle 28b. Where the handles cross, as at 71, there is a pinch point which frictionally interengages the handles and maintains them in position.

As best shown in FIG. 2, the lower central extent of the front outer end wall 36 is formed with an exit opening 74 through which bees may enter and leave the portable beehive. The exit opening may be opened or closed by lowering or raising door flap 26. The door flap extends outwardly from a living hinge, and is secured in the closed position by transversely extending hook and loop fabric elements 76, 78 affixed to the overlying surfaces of the front outer end wall 36 and the door flap 26.

Certain varieties of orchard trees may be difficult to pollinate, and may benefit from the introduction of an additional source of pollen. When the door flap is opened, the surface 79 of the door flap forms a mat upon which may be placed concentrated pollen. Bees exiting the box will walk across the mat and have pollen transferred from the mat to their legs or bodies.

It is believed that queen bees will not lay eggs in regions of excessive air flow or near the hive exit. The exit opening 74 is advantageously situated at an extreme lower edge of the box in order to maximize the region of the interior of the box in which a queen bee is likely to lay eggs, undisturbed by air flow or traffic from the exit opening.

Figure 6:
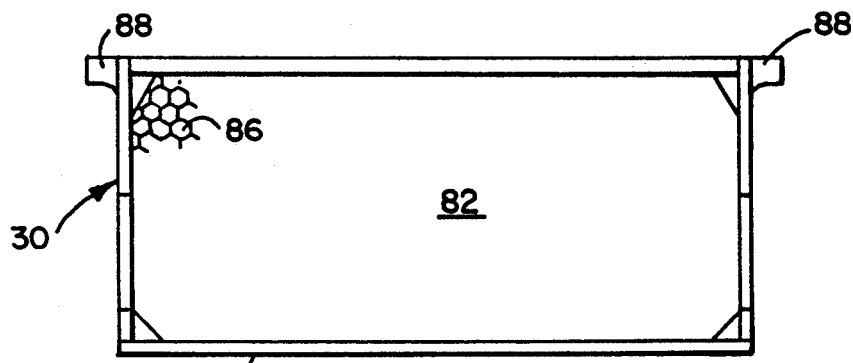
FIG. 6 is a side view of a honeycomb frame.
Figure 7:
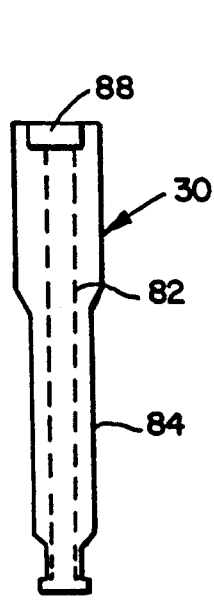
FIG. 7 is an end view of a honeycomb frame.

Details of the honeycomb frames 30a-30d are shown in FIGS. 2, 6, and 7. As is known in the art, the honeycomb frames 30 are identical, and preferably constructed as unitary pieces of molded plastic. Each honeycomb frame 30 is formed with a central, rectangular, vertically disposed panel 82 surrounded by a peripheral flange 84. Both of the major surfaces of the central panel are formed with a shallow, hexagonal matrix structure 86. Extending longitudinally, horizontally outwardly from each of the upper corners of the honeycomb frame there is a short tab extension 88. When the honeycomb frames are placed within the box 22, the tab extensions 88 rest atop the ledges 52, 54 with the central panel suspended longitudinally between the inner end walls 40 and 42. Tab extensions 88 also provide a convenient means for grasping and removing the honeycomb frames.

Figure 8:
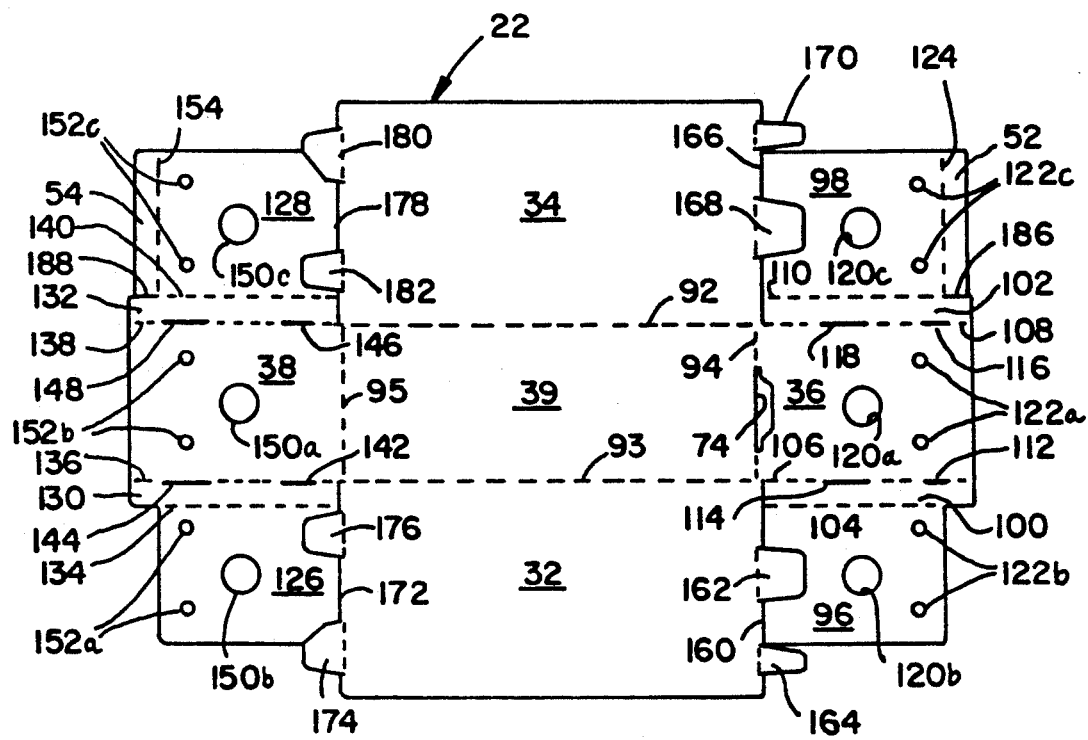
FIG. 8 is a plan view of an unfolded blank from which the portable beehive box is formed.

The box 22 of the portable beehive is constructed as a single piece, folded blank. Details of the blank are shown in FIG. 8. The blank is generally rectangular, and includes side walls 32, 34, front outer end wall 36, rear outer end wall 38, and bottom 39. The side walls and outer end walls are joined to the bottom along fold lines 92-95.

Extending transversely outwardly from the front outer end panel 36, there are first and second front inner end walls 96, 98. Between each of the first and second front inner end walls 96, 98 and the outer front end wall 36, there is a narrow spacer wall 100, 102. The spacer walls are interconnected with the end walls 36, 96, and 98 along fold lines 104, 106, 108, 110. Fold lines 106 and 108, which interconnect the spacer walls 100, 102 with the front outer end wall 36, are each formed with a pair of cuts 112, 114 and 116, 118. Front outer end wall 36 and first and second inner end walls 96, 98 are each formed with a central, circular opening 120a-120c, and two smaller openings 122a-122c. Ledge panel 52 is joined to an edge of second front inner end wall along fold line 124.

Similarly, extending transversely outwardly from the rear outer end panel 38, there are first and second rear inner end walls 126, 128. Between each of the first and second rear inner end walls and the outer rear end wall 38, there is a narrow spacer wall 130, 132. The spacer walls are interconnected with the end walls 38, 126, and 128 along fold lines 134, 136, 138, 140. Fold lines 136 and 138, which interconnect the spacer walls 130, 132 with the rear outer end wall 38, are each formed with a pair of cuts 142, 144 and 146, 148. Rear outer end wall 38 and first and second rear inner end walls 126, 128 are each formed with a central, circular opening 150a-150c, and two smaller openings 152a-152c. Ledge 54 is joined to an edge of second rear inner end wall along fold line 154.

First front inner end wall 96 and spacer wall 100 are separated from left side wall 32 by a cut line 160. Cut line 160 arches into first front inner end wall 96 to form a tab 162 extending from the front vertical edge of the left side wall. The outer extent of left side wall 32 extends beyond first front inner end wall and is formed with tab 164. Similarly, second front inner end wall 98 and spacer wall 102 are separated from right side wall 34 by a cut line 166 which arches to form tab 168 extending from the front vertical edge of the right side wall. The outer extent of left side wall 34 extends beyond second front inner end wall and is formed with tab 170.

First rear inner end wall 126 and spacer wall 130 are separated from left side wall 32 by a Cut line 172. Cut line 172 defines tabs 174, 176 extending from the rear vertical edge of the left side wall. Second rear inner end wall 128 and spacer wall 132 are separated from the right side wall 34 by a cut line 178. Cut line 178 defines tabs 180, 182 extending from the rear vertical edge of the right side wall.

Exit opening 74 is formed along the fold line 94 Ledge 52 is separated from spacer wall 102 by cut line 186. Ledge 54 is separated from spacer wall 132 by cut line 188.

Figure 9:
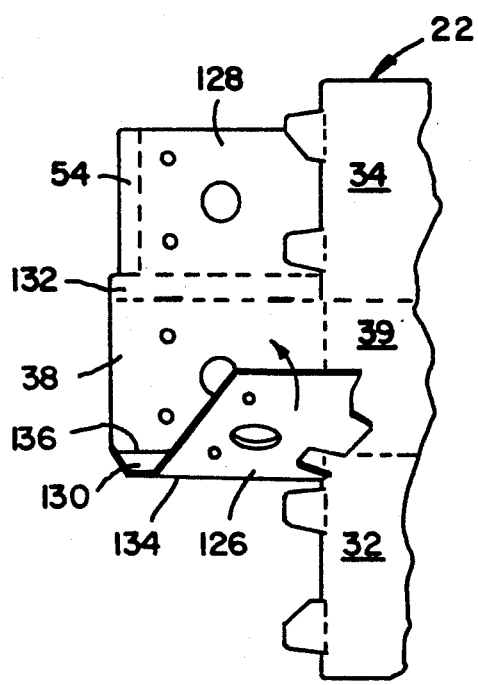
FIG. 9 is a fragmentary plan view illustrating a first step of folding the box blank of FIG. 8.
Figure 10:
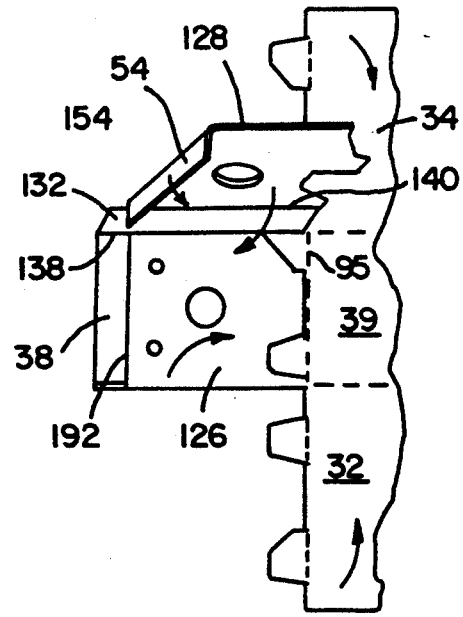
FIG. 10 is a fragmentary plan view illustrating a second step of folding the box blank.
Figure 11:
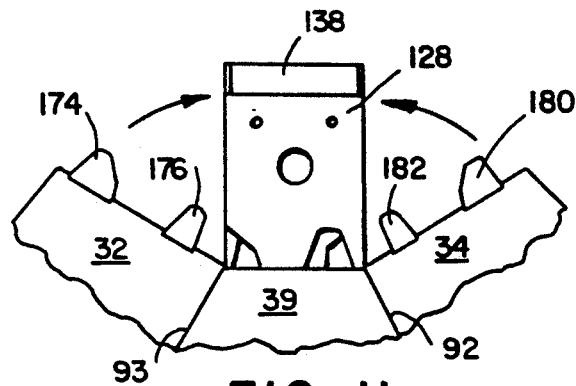
FIG. 11 is a fragmentary inner end view illustrating a third step of folding the box blank.

The steps involved in erecting the box 22 are shown in FIGS. 9-11. These figures show the folding of the rear end of the box. The front end is folded in the same manner.

As shown in FIG. 9, first rear inner wall 126 and spacer wall 130 are folded upward until fold lines 134 and 136 are folded at right angles. First rear inner wall 126 will then be disposed parallel, and spaced apart from rear outer wall 38.

Next, as shown in FIG. 10, second rear inner wall 128 and spacer wall 132 are folded upward until fold lines 138 and 140 are folded at right angles. Ledge 54 is folded at right angles along fold line 154 toward rear outer end wall 38. With this folding completed, second rear inner end wall 128 will be in overlying contact with first rear inner end wall 126 and will together form the rear inner end wall 42 (FIG. 3). Ledge 54 will overlie the upper edge 192 of first rear inner end wall 126 and extend to the inner surface of outer rear end wall 38. The holes 152a-152c will lie in coalignment for receiving the pivot pin portions 70 of the handles. Holes 150a-150c will lie in coalignment to provide a ventilation passageway.

Figure 5:
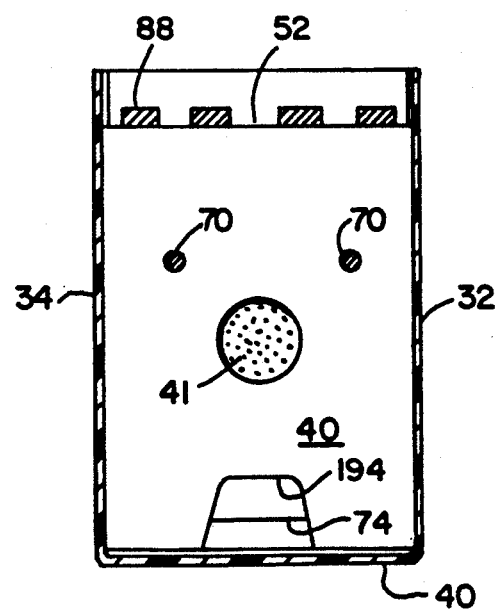
FIG. 5 is a sectional view taken along the line V—V of FIG. 3.

The front end of the box is folded similarly such that second front inner end wall 98 overlies first front inner end wall 96 to cooperatively form front inner end wall 40 (FIG. 3). The holes 120a-120c and 122a-122c are coaligned similarly. As shown in FIG. 5, an opening 194 is formed through front inner end wall 40 at the bottom of the box by the coaligned arched openings left in first front inner end wall 96 by the cutting away of tab 162 and in second front inner end wall 98 by the cutting away of tab 168. Opening 194 provides a passageway from the interior of the box to the exit opening 74.

Outer rear end wall 38 is then folded upward along fold line 95 until fold line 95 is folded at a right angle. Similarly, front rear end wall 36 is folded upward along fold line 94 until fold line 94 is folded at right angle.

Next, as shown in FIG. 11, the side walls 32 and 34 are folded upward along fold lines 92 and 93 until the fold lines are folded at right angles. As the side walls are brought up, tabs 174, 176, 180, and 182 are inserted into slots formed by cut lines 130, 142, 148, and 146, respectively. The tabs make a tight, frictional fit with the slots to maintain the box in an erected state.

The front end of the box is folded similarly such that tabs 162 and 164 are inserted into the slots formed by cut lines 114 and 112, and tabs 168 and 170 are inserted into the slots formed by cut lines 118 and 116.

Figure 12:
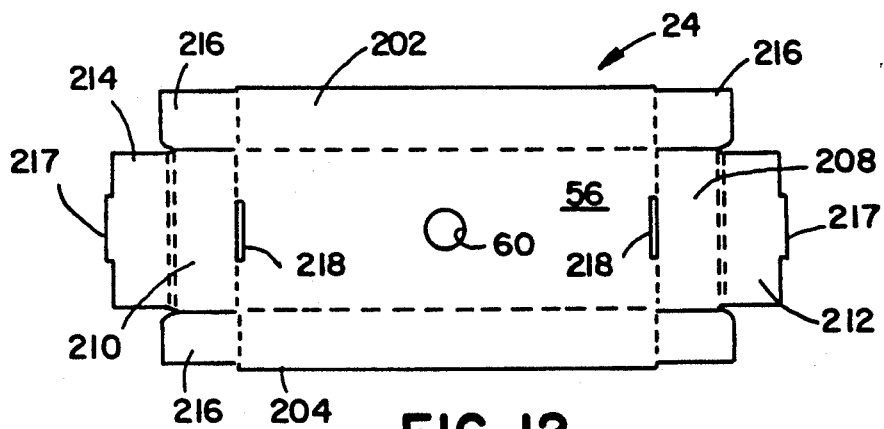
FIG. 12 is a plan view of an unfolded blank from which the cover of the portable beehive is formed.
Figure 13:
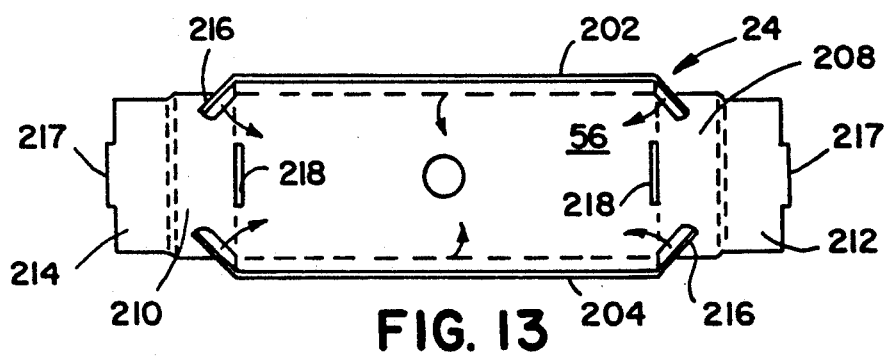
FIG. 13 is a plan view illustrating a first step of folding the cover blank of FIG. 12.
Figure 14:
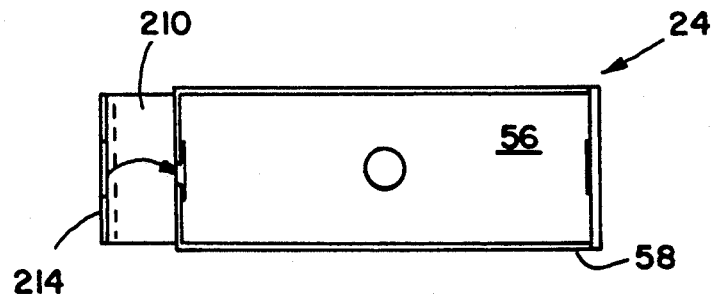
FIG. 14 is a plan view illustrating a second step of folding the cover blank.

Details of the construction and folding of the cover 24 are shown in FIGS. 12-13. Cover 24 is formed from a one-piece folded blank in a known manner. The skirt 58 is formed from flaps 202, 204, 208, 210 extending from the four sides of top panel 56 with fold lines therebetween. Each flap is folded at right angles to the panel 56. End flaps 208 and 210 have extensions 212, 214 which are folded over tabs 216 at the ends of the side flaps 202, 204 The end edges of extensions 212, 214 have lips 217 which fit in openings 218 to maintain the cover in an erected state.

Figure 15:
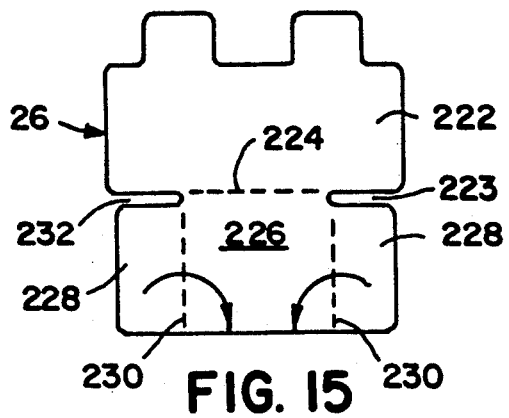
FIG. 15 is a plan view of a blank from which the door flap of the portable beehive is formed.

Details of the door flap 26 are shown in FIG. 15. The door flap is a unitary blank having a door portion 222 joined by a living hinge line 224 to an insert portion 226. The lateral sides of the insert portion have tabs 228 joined by fold lines 230. The outline of the door flap 26 is formed with indents 232 disposed between the door portion 222 and the tabs 228. After the box 22 is folded, door flap 26 is assembled by folding the tabs 228 inwardly so that they overlie the insert portion 226 and inserting the folded insert portion into exit opening 74, preferably prior to the folding step shown in FIG. 11. Tabs 228 are then unfolded, thus capturing the front outer end wall 36 in the indents 232. Hook and loop fabric fastener elements 76 and 78 are adhered to the front outer end wall and the door portion 222 as shown in FIG. 2.

The box 22, cover 24, and door flap 26 are each preferably formed of a corrugated polymeric, or plastic, material which provides the necessary properties of strength, toughness, rigidity, weather resistance, and light weight.

Figure 16:
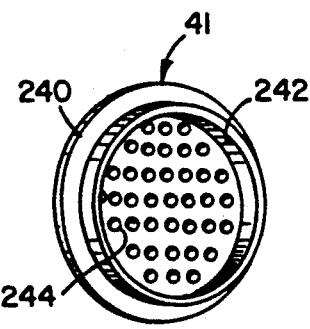
FIG. 16 is a rear perspective view of a hole plug.

Details of the perforated hole plug 41 are shown in FIG. 16. The plug is generally circular, having an outer rim 240 and a cylindrical ring 242 of a diameter smaller than the outer rim 240. The ring 242 is inserted into the holes 120a and 150a of the outer end walls 36, 38, and is held in place by a frictional fit. The central portion of the plug 41 is formed with perforations 244 to provide ventilation.

Top plug 62 (FIG. 2) is similar to plug 41 except that perforations are not provided.

Figure 18:
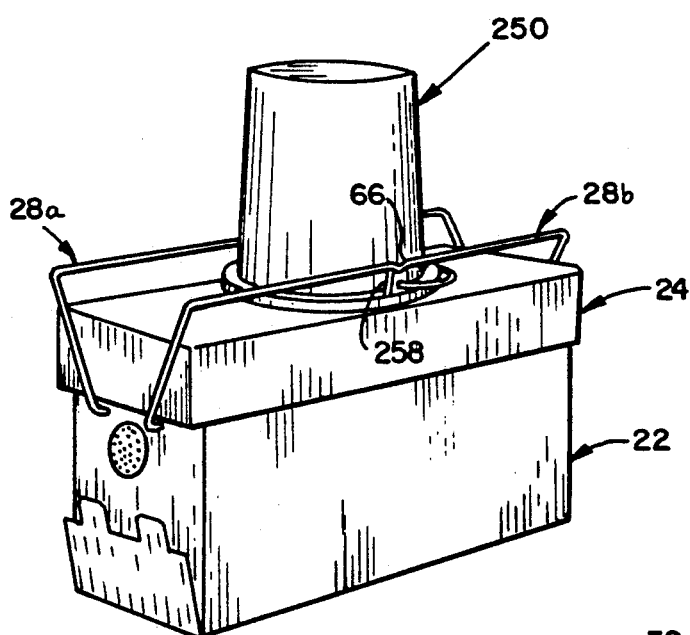
FIG. 18 is a perspective view of the portable beehive with the bee food container secured in place for feeding.

The feeding features of the portable beehive of the invention are shown in FIGS. 17 and 18. A bucket 250 is provided having a removable cover 252. The cover has a central opening 254 over which is affixed a gauze 256 or other suitable material through which a liquid bee food will slowly seep. At diametrically opposite extents of the bucket, there are protrusions 258 having recesses 260 on their undersides. Bail 262 is pivotably attached to the protrusions.

To feed bees within the portable beehive, the bucket 250 is filled with liquid bee food and bucket cover 252 is put in place. Plug 62 is removed from the central opening of the cover 24. Bucket 250 is inverted and placed on the cover 24 with the bucket opening 254 mated with the opening 60 of the beehive cover and the protrusions 258 disposed at the sides of the box 22. Handles 28a and 28b are lifted until detents 66 engage the recesses of the bucket protrusions 258. The handles 28a and 28b thus resiliently press down on the bucket and maintain the bucket in assembly with the cover 24. Bee food then drips through the gauze 256 into the interior of the box. The bucket is removed by swinging the handles downward and replacing plug 62 in hole 60.

Figure 19:
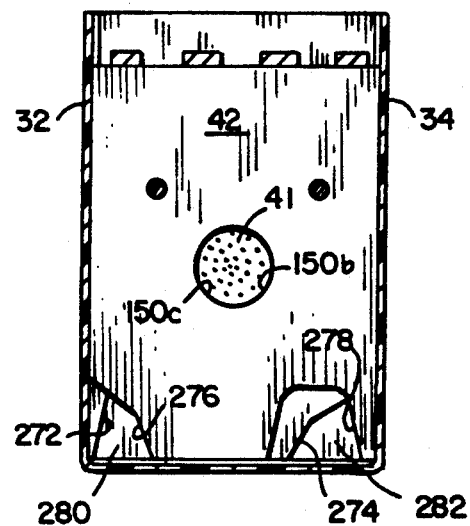
FIG. 19 is a sectional view taken along the line XIX—XIX of FIG. 3.

Additional bee feeding features are shown in FIGS. 3 and 19. A chamber 270 is formed between rear outer end wall 38 and rear inner end wall 42. Two openings 272, 274 are formed through the lower extent of first rear inner end wall 126 by the cutting away of tabs 174 and 176 (FIG. 8). Two openings 276, 278 are formed through the lower extent of second rear inner end wall 128 by the cutting away of tabs 180, 182. Opening 276 overlaps opening 272 so as to form a first opening 280 through rear inner end wall 42. Opening 278 similarly overlaps 274 to form second opening 282. A third opening through the rear inner end wall 42 is formed by the coaligned circular openings 150b, 150c. The chamber 270 may be filled with a granular bee food, such as an invert sugar, up to the lower circumference of the openings 150b, 150c. Bees within the box may reach the food through the openings 280, 282, and 150b, 150c.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

We claim:

1. A portable beehive comprising:
a box including a bottom, first and second laterally spaced apart side walls, and first and second longitudinally spaced apart outer end walls, said box having a bee exit opening formed therethrough;
support means in said box for supporting a plurality of honeycomb frames within said box; and
at least one handle spanning said end walls and attached to said nd walls, said at least one handle including ends formed as pivot pins, said pivot pins extending through said end walls into the interior of said box, end portions of said pivot pins being disposed between said honeycomb frames thereby limiting the range of movement of said honeycomb frames within said box.

2. The portable beehive of claim 1 further comprising a removable top cover for said box, wherein said at least one handle comprises first and second handles spanning said end walls and pivotably attached to said end walls, said handles being pivotable between a first position in which said cover can be removed and a second position in which said handles overlie said cover and prevent said cover from being removed.

3. The portable beehive of claim 1 further comprising a door flap for opening and closing said bee exit.

4. The portable beehive of claim 5 wherein said door flap, when open, forms a mat across which bees exiting the box work.

5. The portable beehive of claim 1 further comprising a first inner end wall deposed inwardly spaced apart from said first outer end wall, said first inner end wall having at least one feeding opening formed therethrough, whereby bee food may be received between said first inner end wall and said first outer end wall and accessed by bees within said box through said feeding opening.

6. A portable beehive comprising:
an open top box including a rectangular bottom, first and second laterally spaced apart side walls, front and rear longitudinally spaced apart outer end walls, a front inner end wall disposed spaced inwardly from said front outer end wall, and a rear inner end wall disposed spaced inwardly from said rear outer end wall, said front and rear inner walls each having an upper edge recessed downwardly from the upper extent of said box, said box formed from a folded, unitary blank;
a plurality of honeycomb frames disposed within said box, each of said honeycomb frames extending longitudinally between said front inner end wall and said rear inner end wall, each of said honeycomb frames suspended in lateral adjacency to one another from said front inner end wall and said rear inner end wall;
a removable top cover for said box; and
a handle means pivotably attached to said box.

7. The beehive of claim 6 wherein said unitary
a central, rectangular bottom panel;
first and second side wall panels extending laterally outwardly from laterally opposed edges of said bottom panel and joined to said bottom panel by fold lines;
front and rear outer end wall panels extending longitudinally outwardly from longitudinally opposed edges of said bottom panel and joined to said bottom panel along fold lines;
first and second spacer panels extending laterally outwardly from laterally opposed edges of said front outer end wall panel and joined to said front outer end wall panel by fold lines;
a first front inner end wall panel extending laterally outwardly from said first spacer panel and joined to said first spacer panel by a fold line;
a second front inner end wall panel extending laterally outwardly from said second spacer panel and joined to said second spacer panel by a fold line;
third and fourth spacer panels extending laterally outwardly from laterally opposed edges of said rear outer end wall panel and joined to said rear outer end wall panel by fold lines;
a first rear inner end wall panel extending laterally outwardly from said third spacer panel and joined to said third spacer panel by a fold line;
a second rear inner end wall panel extending laterally outwardly from said fourth spacer panel and joined to said fourth spacer panel by a fold line;
wherein, when said blank is folded, said first front inner end wall panel is disposed in overlying relationship with said second inner end wall panel, said first and second front inner end wall panels cooperatively forming said front inner end wall, and said first rear inner end wall panel is disposed in overlying relationship with said second rear inner end wall panel, said first and second front inner end wall panels cooperatively forming said rear inner end wall.

8. The portable beehive of 7, wherein said unitary blank further comprises:
   a front ledge panel extending longitudinally outwardly from said first front inner end wall panel and joined to said first front inner end wall panel by a fold line;
   a rear ledge panel extending longitudinally outwardly from said first rear inner end wall panel and joined to said first rear inner end wall panel by a fold line;
   wherein, when said blank is folded, said front ledge panel extends generally horizontally between the upper extent of said front inner end wall and said front outer end wall, and said rear ledge panel extends generally horizontally between the upper extent of said rear inner end wall and said rear outer end wall.

9. The portable beehive of claim 8 wherein said honeycomb frames include tab extensions extending longitudinally outwardly from opposed upper extents of said frames, said tab extensions resting upon said front ledge panel and said rear ledge panel.

10. The portable beehive of claim 7 wherein said front outer end panel, said first front inner end wall panel, and said second front inner end wall panel are each formed with a centrally disposed ventilation opening, said ventilation openings being coaligned when said blank is folded.

11. The portable beehive of claim 6 comprising an opening formed through said rear inner end wall, whereby bee food may be received between said rear inner end wall and said rear outer end wall and accessed by bees within said box through said opening.

12. The portable beehive of claim 6 further including a bee exit opening formed through the lower extent of said front outer end wall.

13. The portable beehive of claim 12 further including a door flap disposed at said bee exit opening.

14. The portable beehive of claim 13 wherein said door flap is joined to said box along a living hinge disposed at the lower extent of said front outer end wall.

15. The portable beehive of claim 14 further comprising hook and loop fabric fastener means affixed to said door flap and said front outer end wall for cooperatively holding said door flap in a closed position overlying said bee exit opening and an open position extending longitudinally outwardly from said bee exit opening.

16. The portable beehive of claim 13 wherein said door flap, when open, extends longitudinally outwardly from said bee exit opening, said flap forming a mat means for contacting bees as the bees pass out of said exit opening.

17. The portable beehive of claim 12 further including an opening formed through the lower extent of said front inner end wall disposed in alignment with said bee exit opening.

18. The portable beehive of claim 6 wherein said handle means comprises first and second handles, each of said first and second handles having a first end pivotably attached to said front outer end wall and a second end pivotably attached to said rear outer end wall, said first and second handles being pivotable to a position in overlying contact with said top cover to prevent removal of said top cover.

19. The portable beehive of claim 6 wherein said handle means comprises first and second handles, each of said first and second handles having a first end portion pivotably extending through said front outer end panel and said front inner end panel, and a second end portion pivotably extending through said rear outer end panel and said rear inner end panel, each of said end portions interposed between adjacent ones of said plurality of honeycomb frames, said end portions thereby limiting the range of movement of said honeycomb frames within said box.

20. The portable beehive of claim 6 further comprising means on said top cover for mating with a bee food container and admitting bee food from the container into said box, said handle means comprising first and second handles pivotably attached to and spanning said front outer end wall and said rear outer end wall, said first and second handles being pivotable to a position in engagement with said bee food container for maintaining said bee food container in mating relationship with said top cover.

21. The portable beehive of claim 20 wherein said bee food container includes first and second laterally spaced recesses, each of said first and second handles formed with a detent means for engaging one of said recesses.

22. A portable beehive comprising:
   an open top box formed as a folded, unitary blank, including a rectangular bottom, first and second laterally spaced apart side walls, a front end wall, and a rear end wall longitudinally spaced apart from said front end wall;
   a plurality of honeycomb frames carried within said box in lateral adjacency;
   a removable top cover for said box and formed with a central opening for admitting bee food from a bee food container supported atop said top cover;
   first handle extending longitudinally and spanning said front end wall and said rear end wall;
   a second handle extending longitudinally and spanning said front end wall and said rear end wall;
   said first and second handles being pivotable among a first position wherein said handles extend along said first and second side walls whereby said top cover may be removed and replaced, a second position wherein said handles extend above said top cover whereby said portable beehive may be carried by said handles, a third position wherein said handles lie against said top cover and hold said top cover in place, and a fourth position wherein said handles engage and maintain a bee food container in position atop said top cover.

23. The portable beehive of claim 22 wherein said first and second handles are formed with detent means for engaging said bee food container.

24. The portable beehive of claim 22 wherein said first and second handles include first end portions pivotably extending through said front end wall and second end portions pivotably extending through said second end wall, said end portions disposed in the interior of said box and interposed between adjacent ones of said honeycomb frames thereby limiting the range of lateral movement of said honeycomb frames within said box.

25. The portable beehive of claim 22 further comprising a bee exit opening formed through said front end wall, and a door flap extending from said front end wall adjacent said bee exit opening, said door flap being selectively positionable to close or open said bee exit opening.

26. A portable beehive comprising:
   a box including a bottom, first and second laterally spaced apart side walls, and first and second longitudinally spaced apart outer end walls, said box having a bee exit opening formed therethrough;
   support means in said box for supporting a plurality of honeycomb frames within said box;
   a top formed with a feeding opening adapted to mate with the opening of a bee food container placed upon said top; and
   first and second handles spanning said end walls and pivotably attached to said end walls, said handles being pivotable to engage said bee food container and maintain said bee food container in mating relationship with said feeding opening.

27. A portable beehive comprising:
   a box formed as a folded, unitary blank including a bottom, first ant second laterally spaced apart side walls, first and second longitudinally spaced apart outer end walls, a first inner end walls disposed inwardly spaced apart from said first outer end wall and having an upper extend forming a first ledge means, a second inner end wall disposed inwardly spaced apart from said second outer end wall and having an upper extent forming a second ledge means, whereby said first and second ledge means provide a support for a plurality of honeycomb frames extending longitudinally between said first and second ledge means and suspended therefrom, said box having a bee exit opening formed therethrough;
   at least one handle spanning said end walls and attached to said end walls.

28. The portable beehive of claim 27 wherein said box is formed of corrugated, polymeric material.

29. A portable beehive comprising:
   a box including a bottom, fist and second laterally spaced apart side walls, first and second longitudinally spaced apart outer end walls, a first inner end wall disposed inwardly spaced apart from said first outer end wall and having an upper extent forming a first ledge means, a second inner end wall disposed inwardly spaced apart from said second outer end wall and having an upper extend forming a second ledge means, whereby said first and second ledge means provide a support for a plurality of honeycomb frames extending longitudinally between said first and second ledge means and suspended therefrom, said box having a bee exit opening formed therethrough;
   at least one handle spanning said end walls and attached to said end walls, said at least one handle including first and second end portions, said first end portion extending through said first outer end walls and said fist inner end wall into the interior of said box and between adjacent ones of said plurality of honeycomb frames, said second end portion extending through said second outer end wall and said second inner end wall into the interior of said box and between adjacent ones of said plurality of honeycomb frames, said first and second end portions thereby limiting the range of movement of said honeycomb frames within said box.

* * * * *

UNITED STATES PATENT AND TRADEMARK OFFICE
CERTIFICATE OF CORRECTION

PATENT NO. : 5,211,597

DATED : May 18, 1993

INVENTOR(S) : Charles W. Scott et al

Page 1 of 2

It is certified that error appears in the above-identified patent and that said Letters Patent is hereby corrected as shown below:

Column 7, claim 1, line 57:
 "nd" should be --end--

Column 8, claim 4, line 6:
 "5" should be --3--

Column 8, claim 4, line 8:
 "work" should be --walk--

Column 8, claim 5, line 10:
 "deposed" should be --disposed--

Column 8, claim 6, line 24:
 after "inner" insert --end--

Column 8, claim 7, line 37:
 after "The" insert --portable--

Column 8, claim 7, line 37:
 after "unitary" insert --blank comprises--

Column 11, claim 27, line 23:
 second occurrence of "walls" should be --wall--

UNITED STATES PATENT AND TRADEMARK OFFICE
CERTIFICATE OF CORRECTION

PATENT NO. : 5,211,597

DATED : May 18, 1993

INVENTOR(S) : Charles W. Scott et al

It is certified that error appears in the above-identified patent and that said Letters Patent is hereby corrected as shown below:

Column 12, claim 29, line 8:
 "fist" should be --first--

Column 12, claim 29, line 26:
 first occurrence of "walls" should be --wall--

Column 12, claim 29, line 26:
 "fist" should be --first--

Signed and Sealed this

Eighth Day of February, 1994

Attest:

BRUCE LEHMAN

Attesting Officer    Commissioner of Patents and Trademarks